United States Patent Office 2,769,793
Patented Nov. 6, 1956

2,769,793

FIBER-FORMING ACRYLONITRILE POLYMER BLENDS

George E. Ham, Dayton, Ohio, assignor, by mesne assignments, to The Chemstrand Corporation, a corporation of Delaware No Drawing. Application May 24, 1951,
Serial No. 228,130

11 Claims. (Cl. 260—32.6)

This invention relates to new acrylonitrile polymers useful in the preparation of superior synthetic fibers. More particularly, the invention relates to a method of improving the thermal shrinkage of polymers prepared in the conventional manner from fiber-forming acrylonitrile polymers.

It is well-known that polyacrylonitrile and copolymers of 85 percent or more of acrylonitrile and up to 15 percent of other monomeric substances have excellent fiber-forming properties. The conventional technique for preparing synthetic fibers from acrylonitrile polymers involves the dissolution of the polymer in a suitable solvent and thereafter extruding the solution through an orifice, or a spinneret containing a plurality of orifices, into a medium which removes the solvent from the solution and precipitates the polymer in a continuous form. In general, acrylonitrile polymers and the fibers prepared therefrom are notoriously poor in their dye-receptivity. Numerous methods have been developed for the modification of acrylonitrile polymers to improve their dye-receptivity. For example, the acrylonitrile is copolymerized with a minor, but substantial proportion of a dye-receptive monomer or the acrylonitrile polymer is blended with a minor proportion of a dye-receptive polymer. The dye-receptive monomers and polymers are generally the vinyl-substituted N-heterocyclic compounds and polymers thereof which react chemically with acid dyes and retain the dyestuff, even upon subjection to conventional laundering and dry-cleaning operations. These dye-receptive polymers and fibers prepared therefrom frequently do not have all of the desirable properties of the basic acrylonitrile polymers from which they are prepared.

The primary purpose of the present invention is to provide a means of retaining the high tenacity and heat resistance of the polyacrylonitrile or the acrylonitrile polymer after being modified to improve the normal dye-receptivity. A further purpose of this invention is to provide a means of restoring thermal stability to polymers which have been deleteriously affected by being rendered dye-receptive through conventional treatment. A still further purpose of this invention is to provide a new and improved fiber-forming composition and new and valuable general purpose fibers.

The acrylonitrile polymers which may be used in the practice of this invention may be polymers of monomeric composition of which acrylonitrile is at least 85 percent, and preferably 90 percent, of the total monomeric components and of which from two to 15 percent of the total monomeric components is a vinyl-substituted N-heterocyclic monomer which contributes dye-receptivity to the polymer. The relationship of the acrylonitrile and the vinyl-substituted N-heterocyclic monomer may be a conjoint polymerization product, or each of the critical monomers may be polymerized separately and the resultant polymers blended to form the dye-receptive fiber-forming composition.

The acrylonitrile copolymers are the copolymers of from 85 to 98 percent of acrylonitrile and from two to 15 percent of other monomeric components, for example vinyl acetate, styrene, vinyl chloride, vinylidene chloride, alpha-methylstyrene, alkyl acrylates, alkyl methacrylates, alkyl fumarates, alkyl maleates, methacrylonitrile, the vinylpyridines, the alkyl substituted vinylpyridines, and the vinyl, allyl, isopropenyl and methallyl substituted N-heterocyclic compounds. If dye-receptive copolymers are desired, at least one of the other polymerizable compounds should be dye-receptive, for example vinylpyridine or other N-heterocyclic containing monomer.

The acrylonitrile polymers may also be blends of the non-dyeable acrylonitrile polymers of 85 or more percent of acrylonitrile and a substantial portion of a dye-receptive polymer or copolymer, for example, a polyvinylpyridine or a polymer of another N-heterocyclic monomer, or a copolymer of 30 or more percent of the N-heterocyclic monomer and up to 70 percent of a monomer copolymerizable therewith, for example, vinyl acetate, styrene, vinyl chloride, alpha-methylstyrene, vinylidene chloride, alkyl acrylates, alkyl methacrylates, alkyl fumarates and alkyl maleates.

The dye-receptive copolymers and blends described in the preceding paragraphs are not generally as heat resistant as polymers and copolymers of very high proportions of acrylonitrile and minor proportions of other copolymerizable monomers. It has been found that the reduction in thermostability induced in the polymers, copolymers, and blends by the introduction of a substantial portion of the dye-receptive monomer may be recovered by blending the copolymer with a relatively minor proportion of a polymer of a polynuclear monomer. The polymer of a polynuclear monomer is employed in amounts within the range of 0.1 to 20 percent by weight and the polymer, copolymers and blends containing at least 85 percent by weight of acrylonitrile are employed in amounts in the range of 80 to 99.9 percent. Suitable polymers of polynuclear monomers for use in the practice of this invention are poly N-vinylcarbazole, polyvinylanthracene, polyvinylnaphthalene, polyvinylpyrene, polyvinylfluorene, polyvinylphenoxthine, polyacenaphthylene, polyvinylbiphenyl, poly-isopropenylbiphenyl, and polyvinylacenaphthene, and other polymerizable monomers containing a plurality of homocyclic ring structures and/or heterocyclic ring structures.

A number of thermally stable blended polymers may be prepared by mixing the polymers in finely divided form and thereafter fabricating them into fibers by conventional methods, for example, dissolution in solvents and extrusion. If desired, the base copolymer or blend may be dissolved in a suitable solvent and the polymer of the polynuclear monomer dissolved therein prior to fabricating the fibers in accordance with the invention.

Further details of this invention are set forth with respect to the following examples:

Example 1

A copolymer of 8.5 percent of vinylpyridine and 91.5 percent of acrylonitrile was dissolved in dimethylacetamide to the extent of 17 percent solids. The resulting spinning solution was divided into two parts and one sample of the solution was further blended with polyvinylcarbazole to the extent of five percent of the total solid content. The solution was extruded through a spinneret having 30 apertures each 0.005 inch in diameter. The fiber was first extruded into a bath containing a mixture of 40 percent water and 60 percent dimethylacetamide and thereafter into water. The fiber was stretched 19 percent in the bath and after drying on a steam heated cylinder was stretched 371 percent. The resulting fiber was 170.6 denier with a strength of 2.8 grams per denier and had an elongation of from eight to ten percent. The fiber was heated and the dry shrinkage measured over a range of temperatures using the Fisher-Johns Block, which comprises an aluminum block provided with a groove for holding the fiber and equipped with a means for heating the block and measuring both the temperature and the length of the fiber. The fiber containing the polyvinylcarbazole was compared with the control fiber not containing the added polymer. The following table sets forth the temperatures required to produce various percentages of dry shrinkages:

| Dry Shrinkage (Percent) | Polyvinyl-carbazole Blend, ° C. | Control Fiber, ° C. |
|---|---|---|
| 5 | 153 | 120 |
| 10 | 186 | 150 |
| 15 | 205 | 180 |
| 20 | 212 | 195 |

*Example 2*

The procedure of the preceding experiment was repeated except that a copolymer of 97 percent of acrylonitrile and three percent of vinyl acetate was used. The fibers were prepared from the base copolymer and from the copolymer modified by the blending with five percent of polyvinylcarbazole based on the total solids content of the solution. The following table sets forth the observed dry shrinkages and the temperatures at which the stipulated shrinkages were obtained with both the fiber from the modified polymer and the unmodified polymer.

| Dry Shrinkage (Percent) | Polyvinyl-carbazole Blend, ° C. | Control Fiber, ° C. |
|---|---|---|
| 5 | 170 | 135 |
| 7.5 | 209 | 165 |
| 8.5 | 245 | |
| 10.5 | | 210 |

*Example 3*

The experiment of Example 2 was duplicated except that ten percent of polyvinylcarbazole was used. The following table sets forth the dry shrinkage and the temperatures at which the said dry shrinkages were measured:

| Dry Shrinkage (Percent) | Polyvinyl-carbazole Blend, ° C. | Control Fiber, ° C. |
|---|---|---|
| 2.5 | 155 | |
| 5 | 197 | 135 |
| 6 | 240 | |
| 7.5 | 280 | 165 |
| 10 | | 210 |

*Example 4*

The experiment of Example 2 was duplicated except that two percent of polyvinylcarbazole was used. The following table sets forth the dry shrinkage and the temperatures at which the said dry shrinkages were measured:

| Dry Shrinkage (Percent) | Polyvinyl-carbazole Blend, ° C. | Control Fiber, ° C. |
|---|---|---|
| 2.5 | 155 | |
| 5 | 200 | 135 |
| 6 | 250 | |
| 7 | 256 | 161 |
| 10 | | 210 |

*Example 5*

The experiment of Example 2 was duplicated except that one percent of polyvinylcarbazole was used. The following table sets forth the dry shrinkage and the temperatures at which the said dry shrinkages were measured:

| Dry Shrinkage (Percent) | Polyvinyl-carbazole Blend, ° C. | Control Fiber, ° C. |
|---|---|---|
| 5 | 188 | 135 |
| 7 | 245 | 161 |
| 10 | 270 | 210 |

What I claim is:

1. A heat-stable fiber-forming solution which comprises a blend of from 0.1 to 20% of (A) a polymer selected from the group consisting of poly N-vinyl-carbazole, polyvinylanthracene, polyvinylnaphthalene, polyvinylpyrene, polyvinylfluorene, polyvinylphenoxthine, polyacenaphthylene, polyvinylbiphenyl, polyisopropenylbiphenyl and polyvinylacenaphthene, and from 80 to 99.9% of (B) a polymer selected from the group consisting of polyacrylonitrile, copolymers of at least 85% acrylonitrile and not more than 15% of another polymerizable mono-olefinic monomer copolymerizable therewith, and blends of said acrylonitrile polymer and co-polymers containing at least 85% of acrylonitrile with a polymer of at least 30% of a vinylpyridine and up to 70% of another polymerizable mono-olefinic monomer copolymerizable therewith, both (A) and (B) being dissolved in N,N-dimethylacetamide.

2. A heat-stable fiber-forming solution which comprises a blend of from 0.1 to 10% of (A) a polymer selected from the group consisting of poly N-vinyl-carbazole, polyvinylanthracene, polyvinylnaphthalene, polyvinylpyrene, polyvinylfluorene, polyvinylanthracene, polyvinylnaphthalene, polyvinylpyrene, polyvinylfluorene, polyvinylphenoxthine, polyacenaphthylene, polyvinylbiphenyl, polyisopropenylbiphenyl and polyvinylacenaphthene, and from 90 to 99.9% of (B) a polymer selected from the group consisting of polyacrylonitrile, copolymers of at least 85% acrylonitrile and not more than 15% of another polymerizable mono-olefinic monomer copolymerizable therewith, and blends of said acrylonitrile polymer and co-polymers containing at least 85% of acrylonitrile with a polymer of at least 30% of a vinylpyridine and up to 70% of another polymerizable mono-olefinic monomer copolymerizable therewith, both (A) and (B) being dissolved in N,N-dimethylacetamide.

3. The fiber-forming solution as defined in claim 2 wherein (A) is polyvinylcarbazole.

4. The fiber-forming solution as defined in claim 2 wherein (A) is polyvinylnaphthalene.

5. The fiber-forming solution as defined in claim 2 wherein (A) is polyacenaphthylene.

6. The fiber-forming solution as defined in claim 2 wherein (A) is polyvinylphenoxthine.

7. The fiber-forming solution as defined in claim 2 wherein (A) is polyvinylpyrene.

8. The fiber-forming solution as defined in claim 2 wherein (B) is polyacrylonitrile.

9. The fiber-forming solution as defined in claim 2 wherein (B) is a copolymer of at least 85% of acrylonitrile and not more than 15% of vinyl acetate.

10. The fiber-forming solution as defined in claim 2 wherein (B) is a copolymer of from 85 to 98% of acrylonitrile and from 2 to 15 percent of vinylpyridine.

11. The fiber-forming solution as defined in claim 2 where (B) is a blend of a copylmer of at least 90% of acrylonitrile and up to 10% of vinyl acetate with a copolymer of from 30 to 70% of a vinylpyridine and from 70 to 30% of acrylonitrile.

(References on following page)

References Cited in the file of this patent

UNITED STATES PATENTS

| | | |
|---|---|---|
| 2,072,465 | Reppe et al. | Mar. 2, 1937 |
| 2,449,528 | Flowers et al. | Sept. 14, 1948 |
| 2,496,868 | Flowers | Feb. 7, 1950 |
| 2,527,863 | Webb | Oct. 31, 1950 |
| 2,637,717 | Basdekis | May 5, 1953 |
| 2,641,585 | Ham | June 9, 1953 |
| 2,643,990 | Ham | June 30, 1953 |
| 2,657,191 | Coover et al. | Oct. 27, 1953 |